United States Patent
Maruyama et al.

(10) Patent No.: US 10,800,872 B2
(45) Date of Patent: Oct. 13, 2020

(54) EPOXY RESIN, EPOXY RESIN COMPOSITION, EPOXY RESIN CURED PRODUCT, AND COMPOSITE MATERIAL

(71) Applicant: Hitachi Chemical Company, Ltd., Chiyoda-ku, Tokyo (JP)

(72) Inventors: Naoki Maruyama, Tokyo (JP); Tomoko Higashiuchi, Tokyo (JP); Kazumasa Fukuda, Tokyo (JP); Yuka Yoshida, Tokyo (JP); Yoshitaka Takezawa, Tokyo (JP)

(73) Assignee: HITACHI CHEMICAL COMPANY, LTD., Chiyoda-ku, Tokyo (JP)

( * ) Notice: Subject to any disclaimer, the term of this patent is extended or adjusted under 35 U.S.C. 154(b) by 0 days.

(21) Appl. No.: 16/341,559

(22) PCT Filed: Oct. 13, 2017

(86) PCT No.: PCT/JP2017/037267
§ 371 (c)(1),
(2) Date: Apr. 12, 2019

(87) PCT Pub. No.: WO2018/070534
PCT Pub. Date: Apr. 19, 2018

(65) Prior Publication Data
US 2019/0284332 A1    Sep. 19, 2019

(30) Foreign Application Priority Data

Oct. 14, 2016  (WO) .................. PCT/JP2016/080629

(51) Int. Cl.
| | | |
|---|---|---|
| *C08G 59/24* | (2006.01) | |
| *C08G 59/22* | (2006.01) | |
| *C08L 63/00* | (2006.01) | |
| *C08G 59/50* | (2006.01) | |
| *C08G 59/20* | (2006.01) | |
| *C08G 59/68* | (2006.01) | |

(52) U.S. Cl.
CPC ........... *C08G 59/245* (2013.01); *C08G 59/20* (2013.01); *C08G 59/24* (2013.01); *C08G 59/5033* (2013.01); *C08L 63/00* (2013.01); *C08G 59/688* (2013.01)

(58) Field of Classification Search
CPC ......... C08L 63/00; C08G 59/22; C08G 59/24; C08G 59/245

USPC .......................................................... 523/400
See application file for complete search history.

(56) References Cited

U.S. PATENT DOCUMENTS

| 10,597,485 B2 | 3/2020 | Tanaka ................. C08G 59/066 |
| 10,662,279 B2* | 5/2020 | Yoshida ................... C08K 3/22 |
| 2003/0232964 A1 | 12/2003 | Akatsuka ............... C08G 59/02 528/403 |
| 2012/0149807 A1 | 6/2012 | Asaumi ................... C07C 67/31 523/457 |
| 2017/0349695 A1* | 12/2017 | Katagi ....................... C08J 5/18 |
| 2019/0040183 A1* | 2/2019 | Yoshida ............... C08G 59/245 |
| 2019/0256643 A1* | 8/2019 | Katagi ................... C08G 59/24 |
| 2019/0284332 A1 | 9/2019 | Maruyama ............. C08G 59/24 |
| 2019/0338068 A1* | 11/2019 | Maruyama ........... C08G 59/504 |
| 2020/0002464 A1* | 1/2020 | Yoshida ................... C08J 5/042 |

FOREIGN PATENT DOCUMENTS

| EP | 3514190 A1 | 7/2019 | |
| EP | 3527604 A1 | 8/2019 | |
| EP | 3597687 A1 | 1/2020 | |
| JP | 2013-227451 A | 11/2013 | |
| JP | 2016-113540 A | 6/2016 | |
| WO | WO-2016/104772 A1 | 6/2016 | |
| WO | WO-2016/104788 A1 | 6/2016 | |
| WO | WO-2017145410 A1 * | 8/2017 | ........... C08G 59/245 |
| WO | WO-2017221811 A1 * | 12/2017 | ............. C08G 59/50 |

* cited by examiner

*Primary Examiner* — Michael J Feely
(74) *Attorney, Agent, or Firm* — Faegre Drinker Biddle & Reath LLP

(57) ABSTRACT

An epoxy resin, comprising an epoxy compound having a mesogen structure,
wherein, when performing a process of decreasing a temperature of the epoxy resin from 150° C. to 30° C. at a rate of 2° C./min, and a process of increasing the temperature of the epoxy resin from 30° C. to 150° C. at a rate of 2° C./min, in this order,
the epoxy resin has a maximum value of $\eta'2/\eta'1$ of 20 or less within a temperature range of from 30° C. to 150° C., wherein $\eta'1$ is a dynamic shear viscosity (Pa·s) measured in the process of decreasing the temperature, and $\eta'2$ is a dynamic shear viscosity (Pa·s) measured in the process of increasing the temperature, $\eta'1$ and $\eta'2$ being measured at the same temperature, and a value $\eta'2$ measured at 100° C. is 1000 Pa·s or less.

10 Claims, 1 Drawing Sheet

US 10,800,872 B2

EPOXY RESIN, EPOXY RESIN COMPOSITION, EPOXY RESIN CURED PRODUCT, AND COMPOSITE MATERIAL

TECHNICAL FIELD

The invention relates to an epoxy resin, an epoxy resin composition, an epoxy resin cured product, and a composite material.

BACKGROUND ART

Epoxy resin is used in various applications for its excellent thermal resistance. In view of a trend of increasing the use temperature of a power device, improvement in thermal conductivity of epoxy resin has been studied.

An epoxy resin including an epoxy compound having a mesogenic structure in its molecule (hereinafter, also referred to as a mesogen-containing epoxy resin) is known to exhibit excellent thermal conductivity. However, since a mesogen-containing epoxy resin generally has a higher viscosity than other epoxy resins, fluidity may not be sufficient during the processing.

In this regard, addition of a solvent to reduce viscosity may be a possible way to improve the fluidity of a mesogen-containing epoxy resin. Further, as a mesogen-containing epoxy resin having excellent fluidity and thermal conductivity, an epoxy resin having a specific molecular size, obtained by reacting an epoxy monomer having a mesogenic structure with a divalent phenol compound, has been proposed (see, for example, Patent Document 1 and Patent Document 2).

PRIOR ART DOCUMENTS

Patent Document

[Patent Document 1] International Publication No. WO 2016-104772
[Patent Document 2] Japanese Patent Application Laid-Open No. 2016-113540

SUMMARY OF THE INVENTION

Problems to be Solved by the Invention

In a method of adding a solvent to a mesogen-containing epoxy resin, formation of voids due to the solvent may occur during curing, and affect the product quality. The mesogen-containing epoxy resins obtained by the method described in Patent Document 1 and Patent Document 2 achieve a lowered softening point, but are still high in viscosity and yet to be improved in terms of handleablitiy.

In view of the above, the invention aims to provide an epoxy resin and an epoxy resin composition having excellent handleability. The invention also aims to provide an epoxy resin cured product and a composite material obtained by using the epoxy resin or the epoxy resin composition.

Means for Solving the Problem

The means for solving the problem include the following embodiments.
<1> An epoxy resin, comprising an epoxy compound having a mesogen structure,
wherein, when performing a process of decreasing a temperature of the epoxy resin from 150° C. to 30° C. at a rate of 2° C./min, and a process of increasing the temperature of the epoxy resin from 30° C. to 150° C. at a rate of 2° C./min, in this order,
the epoxy resin has a maximum value of $\eta'2/\eta'1$ of 20 or less within a temperature range of from 30° C. to 150° C., wherein $\eta'1$ is a dynamic shear viscosity (Pa·s) measured in the process of decreasing the temperature, and $\eta'2$ is a dynamic shear viscosity (Pa·s) measured in the process of increasing the temperature, $\eta'1$ and $\eta'2$ being measured at the same temperature, and a value of $\eta'2$ measured at 100° C. is 1000 Pa·s or less.
<2> The epoxy resin according to <1>, being configured to form a smectic structure when cured by reaction with a curing agent.
<3> An epoxy resin composition, comprising the epoxy resin according to <1> or <2> and a curing agent.
<4> An epoxy resin cured product, comprising a cured product of the epoxy resin composition according to <3>.
<5> A composite material, comprising the epoxy resin cured product according to <4> and a reinforcing material.

Effect of the Invention

According to the invention, an epoxy resin and an epoxy resin composition having excellent handleability are provided. Further, an epoxy resin cured product and a composite material obtained by using the epoxy resin or the epoxy resin composition are provided.

EMBODIMENTS FOR IMPLEMENTING THE INVENTION

Figure 1:
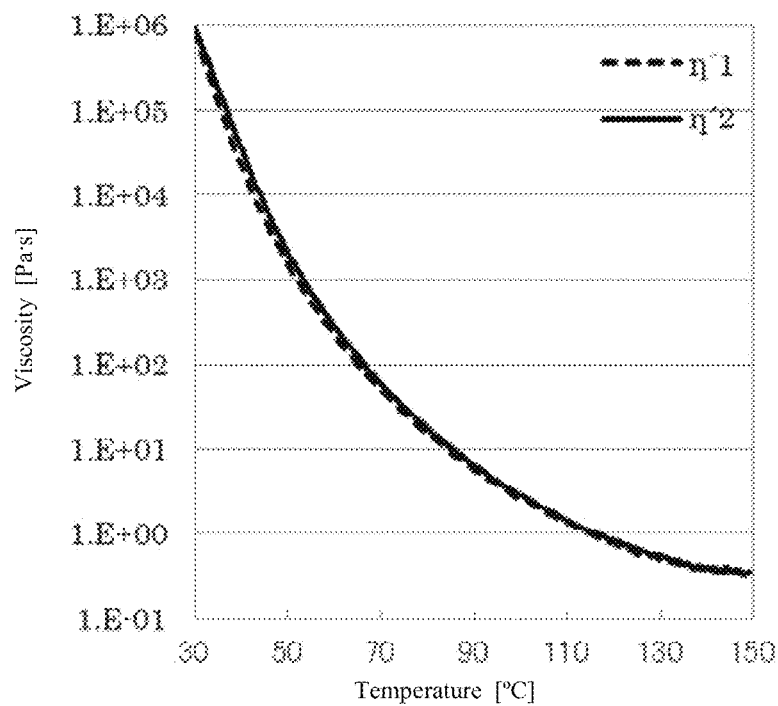
FIG. 1 is a graph showing the results of the measurement of dynamic shear viscosity of the epoxy resin prepared in Example 1.

In the following, the embodiments for implementing the invention are explained. However, the invention is not limited to the embodiments. The elements of the embodiments (including steps) are not essential, unless otherwise stated. The numbers and the ranges thereof do not limit the invention as well.

In the specification, the numerical range represented by "from A to B" includes A and B as a minimum value and a maximum value, respectively.

In the specification, when numerical ranges are described in a stepwise manner, the values of the upper or lower limit of each numerical range may be substituted by the values of the upper or lower limit of the other numerical range, or may be substituted by the values described in the Examples.

In the specification, when there are more than one kind of substances corresponding to a component of a composition, the content of the component refers to a total content of the substances, unless otherwise stated.

In the specification, the epoxy compound refers to a compound having an epoxy group in its molecule. The epoxy resin refers to a collective concept of epoxy compounds that are not in a cured state.

<Epoxy Resin>

The epoxy resin of the embodiment includes an epoxy compound having a mesogen structure, wherein, when performing a process of decreasing a temperature of the epoxy resin from 150° C. to 30° C. at a rate of 2° C./min, and a process of increasing the temperature of the epoxy resin from 30° C. to 150° C. at a rate of 2° C./min, in this order, the epoxy resin has a maximum value of η'2/η'1 of 20 or less within a temperature range of from 30° C. to 150° C., wherein η'1 is a dynamic shear viscosity (Pa·s) measured in the process of decreasing the temperature, and η'2 is a dynamic shear viscosity (Pa·s) measured in the process of increasing the temperature, η'1 and η'2 being measured at the same temperature, and a value of η'2 measured at 100° C. is 1000 Pa·s or less.

In the embodiment, the measurement of the dynamic shear viscosity (hereinafter, also simply referred to as viscosity) is performed according to JIS K 7244-10:2005 using a rheometer at an oscillation mode. The measurement is performed by using a parallel plate with a diameter of 12 mm, at a frequency of 1 Hz, a gap of 0.2 mm and a distortion of 2%.

Prior to the measurement, the epoxy resin is melted at 150° C. for at least 3 minutes. Then, a process of decreasing the temperature from 150° C. to 30° C. at a rate of 2° C./min and a process of elevating the temperature from 30° C. to 150° C. at a rate of 2° C./min are performed in this order. During the processes, the dynamic shear viscosity is measured at least once while the temperature changes by 1° C. As a rheometer, MCR-301 from Anton-Paar may be used, for example.

The mesogen-containing epoxy resin generally includes highly-ordered molecules and is highly crystalline. When the temperature of a highly crystalline mesogen-containing epoxy resin is changed, a phase transition, between a liquid crystal phase or an isotropic phase and a crystal phase, is caused at a specific temperature.

For example, in a case of a mesogen-containing epoxy resin that is in a liquid crystal phase or an isotropic phase at 150° C. and a crystal phase at 30° C., a phenomenon in which the viscosity measured during the process of elevating the temperature is higher than the viscosity measured during the process of decreasing the temperature, even when the viscosities are measured at the same temperature (temperature hysterisis) may be observed in the measurement of performing a process of decreasing the temperature from 150° C. to 30° C. at a rate of 2° C./min and a process of elevating the temperature from 30° C. to 150° C. at a rate of 2° C./min. The reason for this phenomenon is that the phase transition to a crystal phase due to a strong orientation of mesogenic structure cannot follow a temperature change at the rate of 2° C./min.

Specifically, a mesogen-containing epoxy resin that exhibits temperature hysterisis, which is in an equilibrium state and exhibits a crystal phase when the temperature is maintained at 100° C., may have a viscosity that corresponds to a liquid crystal phase or an isotropic phase at 100° C. when the temperature decreases by 2° C./min, without reaching an equilibrium state. On the other hand, the mesogen-containing epoxy resin may have a viscosity that corresponds to a crystal phase at 100° C. when the temperature is increased from 30° C. at which the epoxy resin is crystalized.

As mentioned above, there is a gap between the viscosity during the temperature decrease and the viscosity during the temperature increase, even at the same temperature, due to different states of phase.

The mesogenic epoxy resin that exhibits temperature hysterisis tends to have a higher viscosity during the temperature increase process than the temperature decrease process, even at the same temperature. An epoxy resin that tends to behave like this and become crystalline when the temperature is changed at a rate of 2° C./min may exhibit a crystal phase in an equilibrium state, and may be unstable in terms of handling, such as fluidity, spreadability and formability.

In addition, when a resin that exhibits temperature hysterisis is in the form of a sheet, the sheet may become crystalline and problems such as cracking may occur, depending on the thickness, when it is stored in the form of a roll.

The epoxy resin of the embodiment has a maximum value of η'2/η'1 of 20 or less within a temperature range of from 30° C. to 150° C. Specifically, the value of η'2, a dynamic shear viscosity measured in the process of increasing the temperature, is relatively close to the value of η'1, a dynamic shear viscosity measured in the process of decreasing the temperature, which means that the viscosity sufficiently decreases while the temperature is increasing. Therefore, the epoxy resin can be suitably used for a process in which the temperature is increased in a relatively rapid manner.

Further, the epoxy resin has a value of η'2 measured at 100° C. of 1,000 Pa·s or less. Therefore, the epoxy resin exhibits excellent spreadability.

The temperature at which the epoxy resin melts is not particularly limited, as long as it is lower than or equal to 150° C. from which the temperature is decreased. From the viewpoint of handleability of the epoxy resin, the temperature at which the epoxy resin melts is preferably 130° C. or less, more preferably 100° C. or less. However, since a degree of orientation of molecules tends to decrease when the temperature at which the epoxy resin melts is low, the melting point of the epoxy resin is preferably 0° C. or more, more preferably 50° C. or more, from the viewpoint of ensuring a degree of orientation of molecules during a curing process.

The melting point of the epoxy resin can be determined from a melting peak temperature measured by differential scanning calorimetry at a heat rate of 10° C./min, for example.

The maximum value of η'2/η'1, obtained in a temperature range of from 30° C. to 150° C., is 20 or less, preferably 10 or less, more preferably 5 or less, further preferably 2 or less. The smaller the maximum value of η'2/η'1 is, the more the crystallinity of the mesogen-containing epoxy resin is suppressed. Therefore, a sufficient time can be secured during film-forming or processing.

The minimum value of η'2/η'1, obtained in a temperature range of from 30° C. to 150° C., is not particularly limited. Since a mesogen-containing epoxy resin that causes phase transition within a temperature range of from 30° C. to 150° C. has a higher viscosity measured when the temperature is increased (η'2) than a viscosity measured when the temperature is decreased (η'1), the value of η'2/η'1 is generally at least 1.

In a case of a mesogen-containing epoxy resin that does not exhibit temperature hysterisis, the minimum value of η'2/η'1 is 1, in a theoretical sense. However, the minimum value of η'2/η'1 may be less than 1, depending on the factors such as measurement conditions.

The epoxy resin may be an epoxy resin that causes phase transition between a liquid crystal phase or an isotropic phase and a crystal phase in a temperature range of from 30° C. to 150° C., or may be an epoxy resin that is a liquid crystal phase or an isotropic phase at any temperature of from 30° C. to 150° C. From the viewpoint of handleability, the epoxy resin is preferably an epoxy resin that is a liquid crystal phase or an isotropic phase at any temperature of from 30° C. to 150° C.

When the epoxy resin is a liquid crystal phase or an isotropic phase at any temperature of from 30° C. to 150° C., the epoxy resin may be an epoxy resin that does not exhibit temperature hysterisis, or may be an epoxy resin that exhibits temperature hysterisis as long as the maximum value of η'2/η'1 is 20 or less. For example, when the liquid crystal phase is a smectic phase, which is greater in a degree of orientation than a nematic phase, the value of η'2/η'1 tends to become greater. However, since restriction of molecular motion is not as strong as that in a crystal phase, the value of η'2/η'1 in a smectic phase tend to be smaller than that in a crystal phase.

In the epoxy resin, the temperature at which the value of η'2/η'1 is the largest is not particularly limited.

In the epoxy resin, the range of η'1 when the temperature of the epoxy resin is 100° C. is not particularly limited. For example, the range of when the temperature of the epoxy resin is 100° C. is preferably from 0.1 Pa·s to 500 Pa·s, more preferably from 1 Pa·s to 50 Pa·s.

In the epoxy resin, the value of η'2 when the temperature of the epoxy resin is 100° C. is 1,000 Pa·s or less, preferably 500 Pa·s or less, more preferably 200 Pa·s or less, further preferably 50 Pa·s or less.

The epoxy resin preferably forms a higher-order structure in a cured state (resin matrix).

The higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of islands, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity of a cured product.

Whether or not a smectic structure is formed in a cured product obtained by reaction of the epoxy resin and a curing agent can be determined by X-ray diffraction measurement by using, for example, an X-ray diffractometer from Rigaku Corporation. When measurement is performed using CuKα1 line under a tube voltage of 40 kV, a tube current of 20 mA and a sampling width of 0.01°, in a range of 2θ=2° to 30°, a cured product having a smectic structure exhibits a diffraction peak in a range of 2θ=2° to 10°.

(Epoxy Compound)

The epoxy resin of the embodiment includes an epoxy compound having a mesogenic structure. The epoxy resin may include a single kind of epoxy compound having a mesogenic structure, or two or more kinds thereof.

The mesogenic structure refers to a partial structure that contributes to expression of liquid crystallinity, and examples thereof include a biphenyl structure, a phenyl benzoate structure, a cyclohexyl benzoate structure, an azobenzene structure, a stilbene structure, a terphenyl structure, a naphthalene structure, an anthracene structure, derivatives of these structures, and a structure in which two or more of these structures are linked via a linking group.

Since a compound having a mesogenic structure may exhibit liquid crystallinity in a reaction-inducing manner, it is important whether the compound exhibits liquid crystallinity in a state of being cured.

At least part of the epoxy compound may be a multimer, a compound having a structure derived from two or more epoxy compounds in the form of a monomer (hereinafter, also referred to as an epoxy monomer). When at least part of the epoxy compound is in a state of a multimer, the epoxy resin tends to be difficult to exhibit temperature hysteresis, as compared with a case in which all of the epoxy compound are in the form of a monomer. In the specification, a multimer having a structure derived from two epoxy monomers may be referred to as a dimer.

The multimer may be obtained by allowing an epoxy group of an epoxy monomer to react with a functional group that is capable of reacting with an epoxy group of a compound, or may be obtained by self-polymerization of epoxy monomers.

Examples of the multimer, obtained by allowing an epoxy group of an epoxy monomer to react with a functional group that is capable of reacting with an epoxy group of a compound, include a compound having a structure represented by the following Formula (A) or Formula (B).

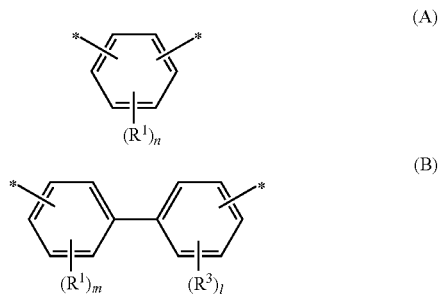

In Formula (A) or Formula (B), * refers to a bonding site to an adjacent atom. Examples of the adjacent atom include an oxygen atom or a nitrogen atom. Each of $R^1$ to $R^3$ independently represents an alkyl group having from 1 to 8 carbon atoms. Each of n, m and l independently represents an integer of from 0 to 4, preferably an integer of from 0 to 2, more preferably an integer of 0 or 1, further preferably 0.

Among the structures represented by Formula (A) or Formula (B), a structure represented by Formula (B) is preferred. When a multimer has a structure represented by Formula (B), the maximum value of η'2/η'1 tends to be smaller, as compared with a multimer has a structure represented by Formula (A). The reason for this is not clear, but it is presumed that an increase in molecular size of a multimer causes an increase in molecular mobility, thereby reducing a degree of orientation.

Among the structures represented by Formula (A) or Formula (B), a structure represented by the following Formula (a) or Formula (b) is preferred. A multimer having a structure represented by the following Formula (a) or Formula (b) tends to have a linear molecule structure, and is considered to have a high stacking ability of molecules and more likely to form a higher-order structure.

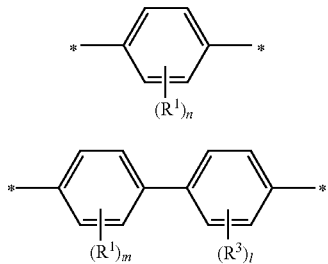

In Formula (a) or Formula (b), definitions and preferred examples of *, $R^1$ to $R^3$, n, m and l are the same as the definitions and the preferred examples of *, $R^1$ to $R^3$, n, m and l in Formula (A) or Formula (B).

The epoxy compound may be an epoxy compound having a structure represented by the following Formula (I).

An epoxy resin including an epoxy compound having a structure represented by the following Formula (I) tends to form a cured product having a high glass transition temperature and a high fracture toughness, as compared with an epoxy resin including an epoxy compound having a different mesogenic structure.

different mesogenic structure, and tends to have a relatively low melting point and easy to handle.

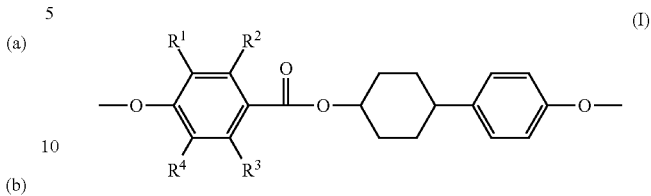

In Formula (I), each of $R^1$ to $R^4$ independently represents a hydrogen atom or an alkyl group having from 1 to 3 carbon atoms. Each of $R^1$ to $R^4$ is preferably a hydrogen atom or an alkyl group having 1 or 2 carbon atoms, more preferably a hydrogen atom or a methyl group, further preferably a hydrogen atom. The number of hydrogen atom represented by $R^1$ to $R^4$ is preferably from 2 to 4, more preferably 3 or 4, further preferably 4. When any one of $R^1$ to $R^4$ is an alkyl group having from 1 to 3 carbon atoms, the alkyl group is preferably at least one of $R^1$ or $R^4$.

When the epoxy compound has two or more structures represented by Formula (I), the epoxy compound may be an epoxy compound having a structure represented by at least one selected from the group consisting of the following Formulae (II-A) to (II-D).

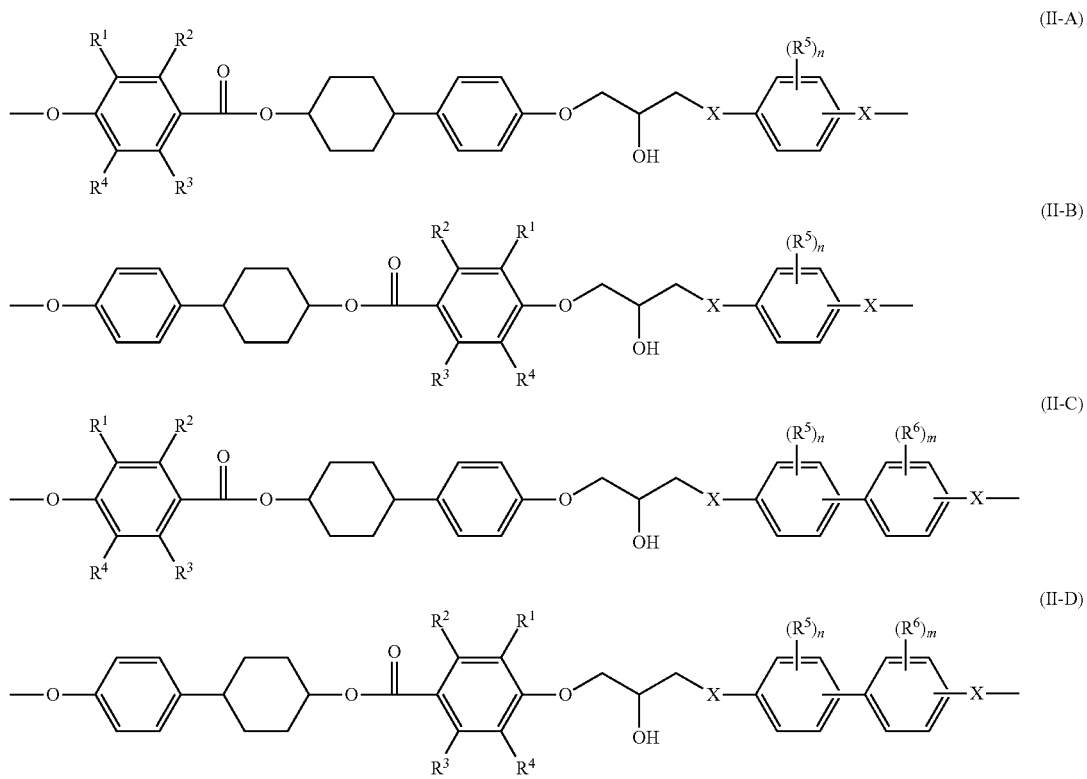

In addition, an epoxy resin including an epoxy compound having a structure represented by Formula (I) tends to exhibit an excellent molecular orientation as compared with an epoxy resin including an epoxy compound having a In Formulae (II-A) to (II-D), each of $R^1$ to $R^4$ independently represents a hydrogen atom or an alkyl group having from 1 to 3 carbon atoms, and each of $R^5$ and $R^6$ independently represents an alkyl group having from 1 to 8 carbon atoms. Each of n and m independently represents an integer of from 0 to 4. Each of X independently represents —O— or —NH—.

Specific examples and preferred ranges of $R^1$ to $R^4$ in Formulae (II-A) to (II-D) are the same as the specific examples and the preferred ranges of $R^1$ to $R^4$ in Formula (I).

In Formulae (II-A) to (II-D), each of $R^5$ and $R^6$ preferably independently represents an alkyl group having from 1 to 8 carbon atoms, more preferably an alkyl group having from 1 to 3 carbon atoms, more preferably a methyl group.

In Formulae (II-A) to (II-D), each of n and m independently represents an integer of from 0 to 4, preferably an integer of from 0 to 2, more preferably an integer of 0 or 1, further preferably 0. Specifically, the benzene ring attached with $R^5$ or $R^6$ in Formulae (II-A) to (II-D) preferably has from 2 to 4 hydrogen atoms, more preferably 3 or 4 hydrogen atoms, further preferably 4 hydrogen atoms.

From the viewpoint of forming a higher-order structure, an epoxy compound having a structure represented by at least one selected from the group consisting of the following Formulae (II-a) to (II-d) is preferred.

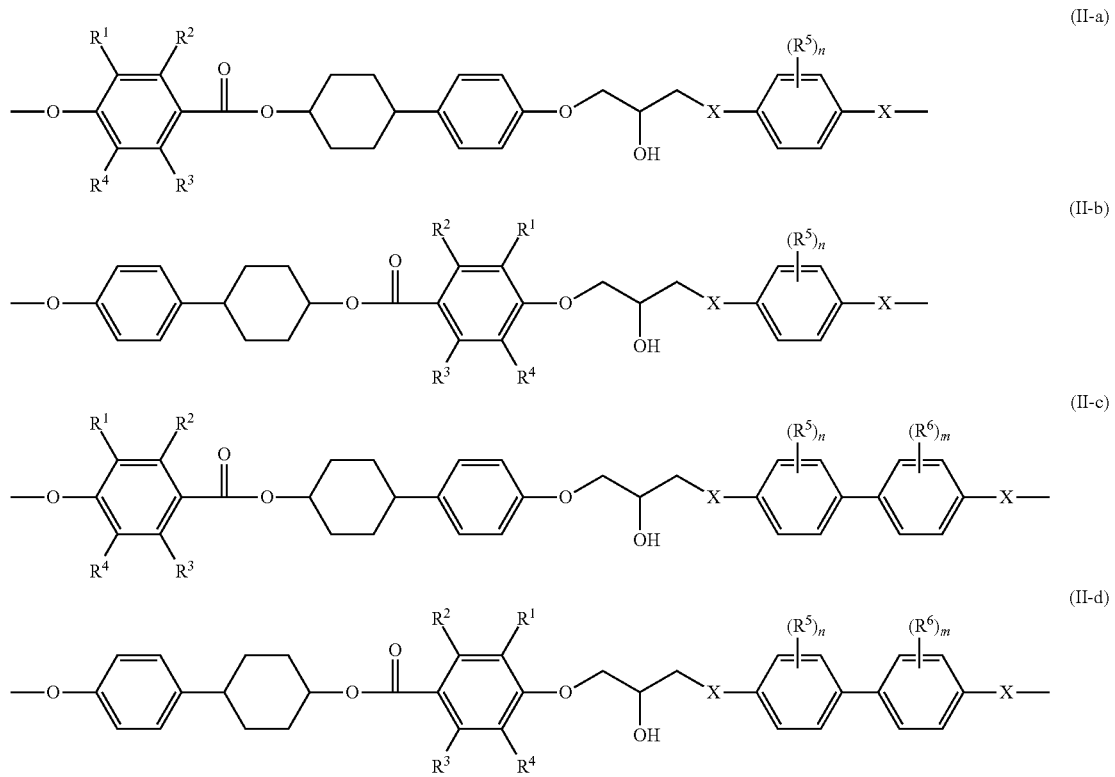

In Formulae (II-a) to (II-d), definitions and preferred examples of $R^1$ to $R^6$, n, m and X are the same as the definitions and the preferred examples of $R^1$ to $R^6$, n, m and X.

Examples of a structure of an epoxy compound having two structures represented by Formula (I) (dimer) include at least one structures represented by the following Formulae (III-A) to (III-F).

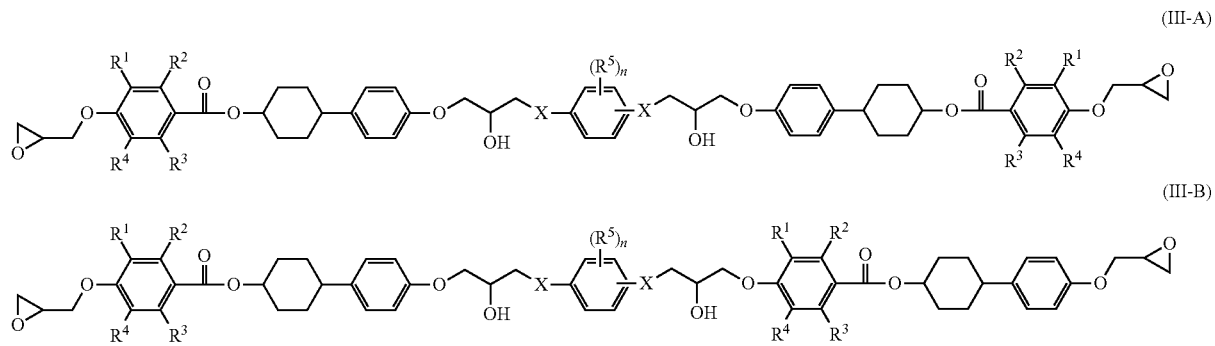

(III-C)
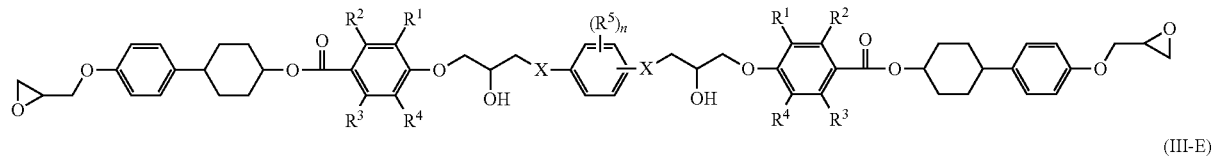
(III-E)
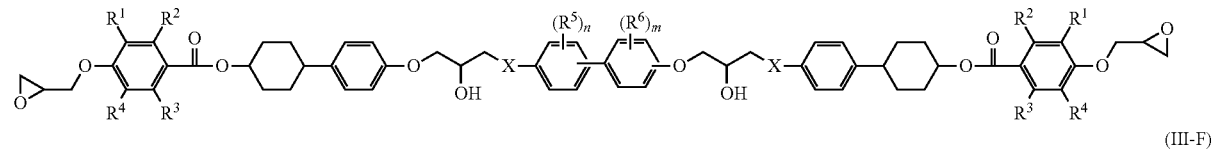
(III-F)
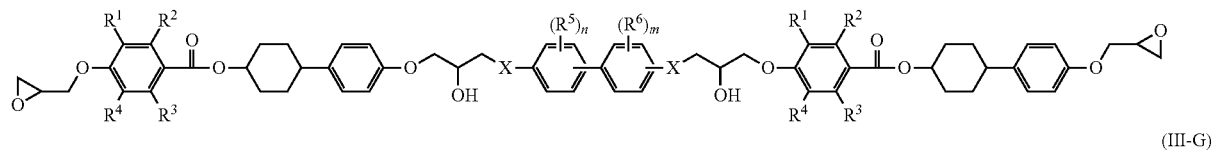
(III-G)
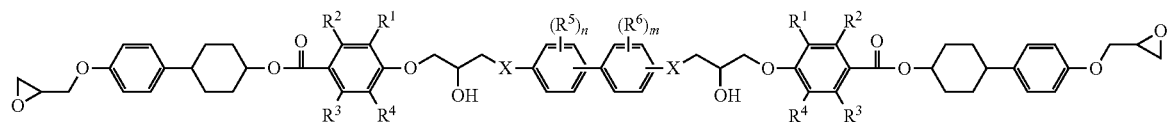
Definitions and preferred ranges of $R^1$ to $R^6$, n, m and X in Formulae (III-A) to (III-F) are the same as the definitions and the preferred ranges of $R^1$ to $R^6$, n, m and X in Formulae (II-A) to (II-D).
From the viewpoint of forming a higher-order structure, epoxy compounds represented by the following Formulae (III-a) to (III-f) are preferred.
(III-a)
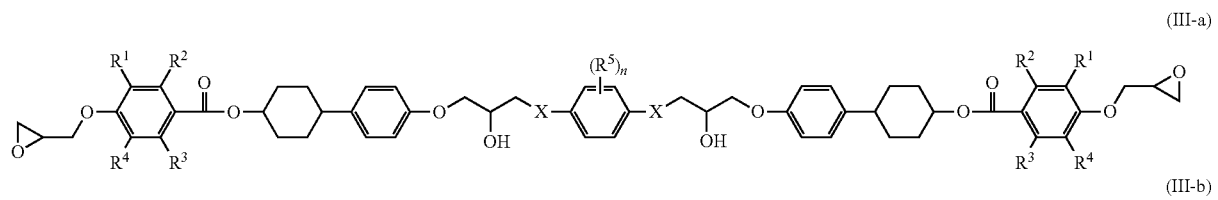
(III-b)
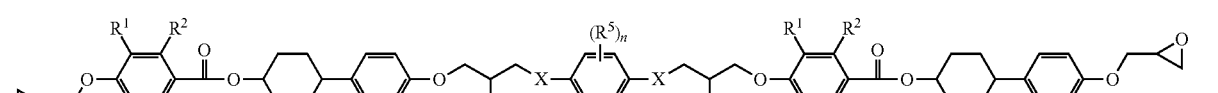
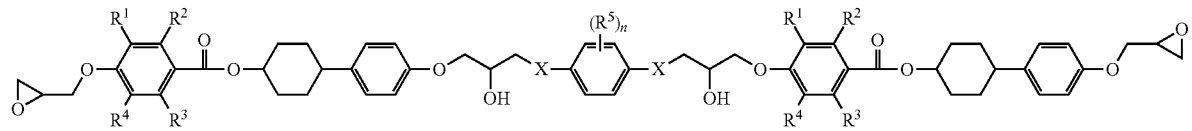
(III-c)
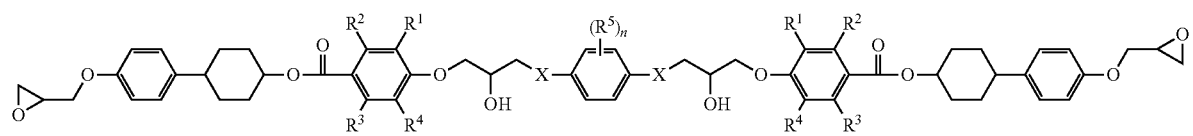
(III-e)
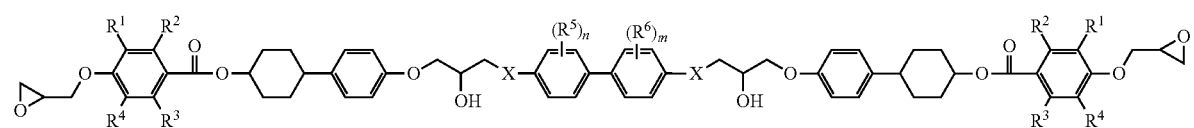

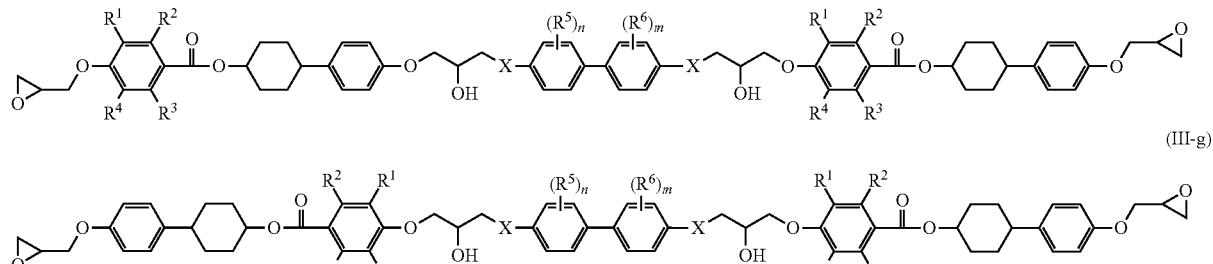

Definitions and preferred ranges of $R^1$ to $R^6$, n, m and X in Formulae (III-a) to (III-f) are the same as the definitions and the preferred ranges of $R^1$ to $R^6$, n, m and X in Formulae (III-A) to (III-F).

(Method of Synthesizing Multimer)

The method of synthesizing a multimer, by allowing an epoxy monomer to react with a compound having a functional group that is capable of reacting with an epoxy group, is not particularly limited. For example, the multimer may be obtained by a method of dissolving an epoxy monomer and a compound having a functional group that is capable of reacting with an epoxy group, and optionally a reaction catalyst, in a solvent, and stirring the same while heating.

Alternatively, for example, a multimer may be synthesized by mixing an epoxy monomer and a compound having a functional group that is capable of reacting with an epoxy group, and optionally a reaction catalyst, without a solvent, and stirring the same while heating.

Examples of the epoxy monomer include an epoxy compound represented by the following Formula (M). The epoxy compound represented by Formula (M) has a mesogenic structure and forms a smectic liquid crystal structure in a cured product by reaction with a curing agent. When the epoxy monomer includes an epoxy compound represented by Formula (M), the epoxy monomer may include a single kind of epoxy compound represented by Formula (M) or two or more kinds thereof.

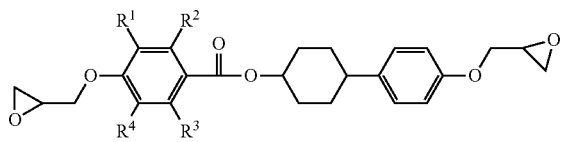

(M)

In Formula (M), each of $R^1$ to $R^4$ independently represents a hydrogen atom or an alkyl group having from 1 to 3 carbon atoms. Each of $R^1$ to $R^4$ is preferably independently a hydrogen atom or an alkyl group having 1 or 2 carbon atoms, more preferably a hydrogen atom or a methyl group, further preferably a hydrogen atom. The number of hydrogen atom represented by $R^1$ to $R^4$ is preferably from 2 to 4, more preferably 3 or 4, further preferably 4. When any one of $R^1$ to $R^4$ is an alkyl group having from 1 to 3 carbon atoms, the alkyl group is preferably at least one of $R^1$ or $R^4$.

Examples of the compound represented by Formula (M) include compounds described in Japanese Patent Application Laid-Open No. 2011-74366, specifically, at least one selected from the group consisting of 4-{4-(2,3-epoxypropoxy)phenyl}cyclohexyl=4-(2,3-epoxypropoxy)benzoate and 4-{4-(2,3-epoxypropoxy)phenyl}cyclohexyl=4-(2,3-epoxypropoxy)-3-methylbenzoate.

The solvent is not particularly limited, as long as it can dissolve an epoxy monomer and a compound having a functional group that is capable of reacting with an epoxy group of the epoxy monomer, and can be heated to a temperature required to cause reaction of the compounds. Specific examples of the solvent include cyclohexanone, cyclopentanone, ethyl lactate, propyleneglycol monomethyl ether and N-methyl pyrrolidone.

The amount of the solvent is not particularly limited, as long as an epoxy monomer and a compound having a functional group that is capable of reacting with an epoxy group of the epoxy monomer, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The compound having a functional group that is capable of reacting with an epoxy group of the specific epoxy monomer is not particularly limited. From the viewpoint of forming a smectic structure in a cured product, the compound is preferably at least one selected from the group consisting of a dihydroxybenzene compound, having a structure in which two hydroxy groups are bound to a benzene ring; a diaminobenzene compound, having a structure in which two amino groups are bound to a benzene ring; a dihydroxybiphenyl compound, having a structure in which each of the two benzene rings in the biphenyl group has a hydroxy group; and a diaminobiphenyl compound, having a structure in which each of the two benzene rings in the biphenyl group has an amino group, respectively. Hereinafter, the compounds are also referred to as specific aromatic compounds.

By causing reaction of an epoxy group of the specific epoxy monomer with a hydroxy group or an amino group of the specific aromatic compound, a multimer, having at least one structure selected from the group represented by Formulae (II-A) to (II-D), can be synthesized.

Examples of the dihydroxybenzene compound include 1,2-dihydroxybenzene (catechol), 1,3-dihydroxybenzene (resorcinol), 1,4-dihydroxybenzene (hydroquinone) and derivatives of these compounds.

Examples of the diaminobenzene compound include 1,2-diaminobenzene, 1,3-diaminobenzene, 1,4-diaminobenzene and derivatives of these compounds.

Examples of the dihydroxybiphenyl compound include 3,3'-dihydroxybiphenyl, 3,4'-dihydroxybiphenyl, 4,4'-dihydroxybiphenyl, and derivatives of these compounds.

Examples of the diaminobiphenyl compound include 3,3'-diaminobiphenyl, 3,4'-diaminobiphenyl, 4,4'-diaminobiphenyl, and derivatives of these compounds.

Derivatives of the specific aromatic compound include a specific aromatic compound having a substitute, such as an alkyl group of from 1 to 8 carbon atoms, on the benzene ring. A single kind of the specific aromatic compound may be used alone, or two or more kinds may be used in combination.

From the viewpoint of forming a smectic structure in a cured product of the epoxy resin, the specific aromatic compound is preferably 1,4-dihydroxybenzene, 1,4-diaminobenzene, 4,4'-dihydroxybiphenyl or 4,4'-diaminobiphenyl. Since the compounds have the hydroxy groups or the amino groups at a para position with respect to each other, a multimer obtained by reacting the compound with an epoxy monomer tends to have a straight structure. Therefore, a smectic structure tends to be formed in a cured product due to a high degree of stacking of the molecules.

The type of the reaction catalyst is not particularly limited, and may be selected based on the reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of heat resistance of a cured product, the reaction catalyst is preferably an organic phosphorous compound.

Examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(dialkoxyphenyl)phosphine, tris(tetraalkoxyphenyl)phosphine, trialkyiphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the epoxy monomer and the compound having a functional group that is capable of reacting with an epoxy group of the epoxy monomer.

In a case of synthesizing a multimer by using an epoxy monomer, the total of the epoxy monomer may react to form a multimer, or the epoxy monomer may partly remain in an unreacted state.

A multimer can be synthesized by using a reaction container, such as a flask in a small scale or a reaction cauldron in a large scale. A specific example of the synthesis method is described below.

An epoxy monomer is placed in a reaction container and a solvent is added as necessary, and the epoxy monomer is dissolved by heating the reaction container to a reaction temperature with an oil bath or a heating medium. Then, a compound having a functional group that is capable of reacting with an epoxy group of the epoxy monomer is added thereto. After dissolving the compound in the solvent, a reaction catalyst is added as necessary, thereby starting the reaction. Subsequently, the solvent is removed under reduced pressure as necessary, and a multimer is obtained.

The reaction temperature is not particularly limited, as long as the reaction of an epoxy group and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the epoxy monomer and the compound having a functional group that is capable of reacting with an epoxy group of the epoxy monomer, used for the synthesis of the multimer, is not particularly limited. For example, the ratio may be adjusted to satisfy a ratio of the number of equivalent of epoxy group (A) to the ratio of the number of equivalent of the functional group that is capable of reacting with an epoxy group (B), represented by A/B, of from 100/100 to 100/1. From the viewpoint of fracture toughness and heat resistance of a cured product, the value of A/B is preferably from 100/50 to 100/1.

The structure of the multimer can be determined by, for example, matching a molecular weight of the multimer, which is presumed to be obtained by the reaction of the epoxy monomer and the compound having a functional group that is capable of reacting with an epoxy group of the epoxy monomer, with a molecular weight of a target compound obtained by liquid chromatography that is performed by a liquid chromatograph having a UV spectrum detector and a mass spectrum detector.

The liquid chromatography is performed by a gradient method using a column for analysis (for example, LaChrom II C16 from Hitachi, Ltd.) while continuously changing the mixture ratio (by volume) of the eluent in the order of acetonitrile/tetrahydrofuran/10 mmol/1 aqueous ammonium acetate solution=20/5/75, acetonitrile/tetrahydrofuran=80/20 (20 min from the start) and acetonitrile/tetrahydrofuran=50/50 (35 min from the start) at a flow rate of 1.0 ml/min. The UV spectrum detector detects an absorbance at a wavelength of 280 nm and the mass spectrum detector detects an ionization voltage as 2700 V.

From the viewpoint of handleability, the content of the multimer in the total epoxy resin is preferably 10% by mass or more, more preferably 20% by mass or more, further preferably 30% by mass or more. From the viewpoint of heat resistance, the content of the multimer in the total epoxy resin is preferably 80% by mass or less, more preferably 75% by mass or less, further preferably 70% by mass or less.

When the epoxy resin includes a dimer as a multimer, the content thereof is not particularly limited. From the viewpoint of heandleability, the content of the dimer in the total epoxy resin is preferably 10% by mass or more, more preferably 15% by mass or more, further preferably 20% by mass or more. From the viewpoint of heat resistance, the content of the dimer in the total epoxy resin is preferably 60% by mass or less, more preferably 55% by mass or less, further preferably 50% by mass or less.

When the epoxy resin includes am epoxy monomer, the content thereof is not particularly limited. From the viewpoint of heat resistance, the content of the epoxy monomer in the total epoxy resin is preferably 30% by mass or more, more preferably 35% by mass or more, further preferably 40% by mass or more. From the viewpoint of handleability, the content of the epoxy monomer in the total epoxy resin is preferably 90% by mass or less, more preferably 80% by mass or less, further preferably 70% by mass or less.

When the epoxy resin includes an epoxy compound having a mesogenic structure (epoxy monomer) and an epoxy compound having two or more of the same mesogenic structures as that of the epoxy monomer (multimer), from the viewpoint of handleability of the epoxy resin, the proportion of the epoxy monomer measured by liquid chromatography is preferably 50% or less of the total epoxy resin.

The epoxy resin including an epoxy monomer in an amount of 50% or less of the total epoxy resin, measured by liquid chromatography, tends to have a smaller maximum value of $\eta'2/\eta'1$ as compared with an epoxy resin including an epoxy monomer in an amount of more than 50% of the total epoxy resin, and tends to have superior handleability. The reason for this is not clear, but it is presumed to be because the epoxy resin includes a multimer, which is high in molecular mobility and has a relatively low degree of orientation, as a major component, and that a speed of crystallization is significantly low or transition to a crystalline phase does not occur.

The proportion of the epoxy monomer measured by liquid chromatography is a proportion of an area of a peak derived from the epoxy monomer with respect to the total area of the peaks derived from all epoxy compounds, shown in a chart obtained by liquid chromatography. Specifically, the proportion is calculated by the following formula. The area of the peak is determined by detecting an absorbance at a wavelength of 280 nm of an epoxy resin for the measurement.

Proportion of area of peak derived from epoxy monomer (%)=(area of peak derived from epoxy monomer/total area of peaks derived from all epoxy compounds)×100

The liquid chromatography is performed by using tetrahydrofuran as a mobile phase, at a sample concentration of 0.5% by mass and a flow rate of 1.0 ml/min. The measurement can be performed by using, for example, L6000 from Hitachi, Ltd as a high-speed liquid chromatograph and C-R4A from Shimadzu Corporation as a data analyzer, with GPC columns such as G2000HXL and G30001-IXL from Tosoh Corporation.

From the viewpoint of improving handleability, the proportion of the epoxy monomer measured by liquid chromatography is preferably 50% or less, more preferably 49% or less, further preferably 48% or less, of the total amount of the epoxy resin.

From the viewpoint of intrinsic viscosity (melt viscosity), the proportion of the epoxy monomer measured by liquid chromatography is preferably 35% or more, more preferably 37% or more, further preferably 40% or more, of the total amount of the epoxy resin.

The epoxy resin may include an epoxy monomer other than an epoxy monomer represented by Formula (I) or a multimer thereof. By including an epoxy monomer other than an epoxy monomer represented by Formula (I) or a multimer thereof, effects such as suppressing crystallization are anticipated. Examples of the epoxy monomer other than an epoxy monomer represented by Formula (I) or a multimer thereof include 3,3',5,5'-tetramethyl-4,4'-biphenol diglycidyl ether.

The number average molecular weight (Mn) and the weight average molecular weight (Mw) of the epoxy resin is not particularly limited.

In the embodiment, the number average molecular weight (Mn) and the weight average molecular weight (Mw) of the epoxy resin is measured by liquid chromatography.

The liquid chromatography is performed at a sample concentration of 0.5% by mass and a flow rate of 1.0 ml/min, using tetrahydrofuran as a mobile phase. A calibration curve is obtained by using a polystyrene standard sample, and the Mn and Mw (polystyrene-based) are calculated.

The measurement can be performed by using a high performance liquid chromatograph (for example, L6000 from Hitachi, Ltd.) and a data analyzer (for example, C-R4A from Shimadzu Corporation) with GPC columns (for example, G2000HXL and G3000 HXL from Tosoh Corporation)

<Epoxy Resin Composition>

The epoxy resin composition of the embodiment includes the epoxy resin of the embodiment as described above, and a curing agent.

(Curing Agent)

The curing agent is not particularly limited, as long as it is capable of causing a curing reaction with the epoxy resin included in the epoxy resin composition. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the epoxy resin composition, the curing agent is preferably an amine curing agent or a phenol curing agent, more preferably an amine curing agent, further preferably a compound having two or more amino groups that are directly bound to a benzene ring.

Specific examples of the amine curing agent include 3,3'-diamnodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide and trimethylene-bis-4-aminobenzoate.

From the viewpoint of forming a smectic structure in a cured product of the epoxy resin composition, the curing agent is preferably selected from 4,4'-diaminodiphenylsulfone, 3,3'-diaminodiphenylsulfone, 1,3-diaminobenzene, 1,4-diaminobenzene, 4,4'-diaminobenzanilide, 1,5-diaminonaphthalene, 4,4'-diaminodiphenylmethane and trimethylene-bis-4-aminobenzoate. From the viewpoint of obtaining a cured product with a high Tg, the curing agent is more preferably 4,4'-diaminodiphenylsulfone and 4,4'-diaminobenzanilide.

Specific examples of the phenol curing agent include a low-molecular phenol compound and a phenol novolac resin obtained by linking low-molecular phenol compounds with a methylene group or the like. Specific examples of the low-molecular phenol compound include a monofunctional phenol compound such as phenol, o-cresol, m-cresol and p-cresol, a bifunctional phenol compound such as catechol, resorcinol and hydroquinone, and trifunctional phenol compound such as 1,2,4-trihydroxybenzene and 1,3,5-trihydroxybenzene.

The content of the curing agent in the epoxy resin composition is not particularly limited. From the viewpoint of efficiency of curing reaction, the content of the curing agent preferably satisfies a ratio of the active hydrogen equivalent (amine equivalent) of the curing agent to the epoxy equivalent (amine/epoxy) of from 0.3 to 3.0, more preferably from 0.5 to 2.0.

(Other Components)

The epoxy resin composition may include components other than the epoxy resin and the curing agent. For example, the epoxy resin composition may include a reaction catalyst, a filler or the like. Specific examples of the reaction catalyst include the compounds as described above as a reaction catalyst used for the synthesis of the specific epoxy compound.

(Use Application)

The use application of the epoxy resin composition is not particularly limited. The epoxy resin composition is suitably applied for a process in which the epoxy resin composition is subjected to relatively rapid heating. For example, the epoxy resin composition may be used for a process of producing FRPs, in which fibers are impregnated with an epoxy resin composition while heating, or a process of producing a sheet-like product in which an epoxy resin composition is spread with a squeegee or the like while heating.

The epoxy resin composition is also suitably applied for a process in which addition of a solvent for adjusting viscosity is desired to be omitted or reduced, for the purpose of suppressing formation of voids in a cured product.

<Epoxy Resin Cured Product and Composite Material>

The epoxy resin cured product of the embodiment is obtained by curing the epoxy resin composition of the embodiment. The composite material includes the epoxy resin cured product of the embodiment and a reinforcing material.

Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone or may include two or more kinds in combination.

EXAMPLES

In the following, the invention is explained by referring to the Examples. However, the invention is not limited to these Examples. The "part" and the "%" are based on mass, unless otherwise specified.

Example 1

To a 500-mL three-necked flask, 50 g of an epoxy monomer (4-{4-(2,3-epoxypropoxy)phenyl}cyclohexyl=4-(2,3-epoxypropoxy)benzoate, the following structure) were placed, and 80 g of propylene glycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring. After confirming that the epoxy monomer was dissolved and the solution became clear, 5.2 g of 4,4'-dihydroxybiphenyl and 0.5 g of triphenylphosphine as a reaction catalyst were added, and further heated at 120° C. After continuing the heating for 3 hours, propylene glycol monomethyl ether was evaporated under reduced pressure, and the residue was cooled to room temperature (25° C.). An epoxy resin, in which a part of the epoxy monomer formed a multimer by reacting with 4,4'-dihydroxybiphenyl, was thus obtained.

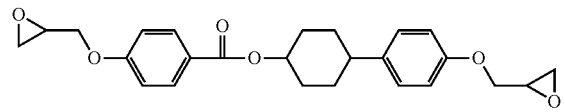 [SMILES: O=C(OC1CCC(c2ccc(OCC3CO3)cc2)CC1)c1ccc(OCC2CO2)cc1]

Subsequently, 50 g of the obtained epoxy resin and 9.4 g of 4,4'-diaminodiphenylsulfone as a curing agent were placed in a stainless steel dish, and heated on a hot plate to 180° C. After the resin in the dish was melted, it was heated at 180° C. for 1 hour. After cooling to room temperature (25° C.), the resin was taken out from the dish and heated in an oven at 230° C. for 1 hour to complete the curing, thereby obtaining an epoxy resin cured product.

A sample for evaluating fracture toughness having a size of 3.75 mm×7.5 mm×33 mm and a sample for evaluating glass transition temperature having a size of 2 mm×0.5 mm×40 mm were prepared from the epoxy resin cured product, respectively.

Example 2

An epoxy resin was obtained in the same manner as Example 1, except that 5.2 g of 4,4'-dihydroxybiphenyl was changed to 3.1 g of hydroquinone. Subsequently, an epoxy resin cured product was prepared in the same manner as Example 1, except that the amount of 4,4'-diaminodiphenylsulfone was changed to 9.8 g.

Example 3

An epoxy resin was obtained by adding 2.5 g of 3,3',5,5'-tetramethyl-4,4'-biphenol diglycidyl ether to 50 g of the epoxy resin obtained in Example 2. Subsequently, an epoxy resin cured product was prepared in the same manner as Example 1, except that the amount of 4,4'-diaminodiphenylsulfone was changed to 10.1 g.

Example 4

An epoxy resin was obtained in the same manner as Example 1, except that 3.0 g of catechol were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 10.1 g.

Example 5

An epoxy resin was obtained in the same manner as Example 1, except that 3.0 g of hydroquinone were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 9.8 g.

Example 6

An epoxy resin was obtained in the same manner as Example 1, except that 2.9 g of hydroquinone were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 9.9 g.

Example 7

An epoxy resin was obtained in the same manner as Example 1, except that the epoxy monomer was changed from (4-{4-(2,3-epoxypropoxy)phenyl} cyclohexyl=4-(2,3-epoxypropoxy)benzoate to 50 g of a mesogenic epoxy monomer represented by the following structure, and that 1.4 g of hydroquinone were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 12.1 g.

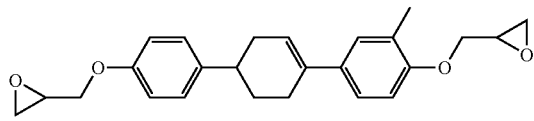 [SMILES: Cc1cc(C2=CCC(c3ccc(OCC4CO4)cc3)CC2)ccc1OCC1CO1]

Comparative Example 1

An epoxy resin was obtained in the same manner as Example 1, except that 1.6 g of hydroquinone were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 11.2 g.

<Comparative Example 2

An epoxy resin was obtained in the same manner as Example 1, except that 2.8 g of hydroquinone were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 10.1 g.

<Comparative Example 3

An epoxy resin was obtained in the same manner as Example 1, except that 1.2 g of catechol were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 12.2 g.

Comparative Example 4

An epoxy resin was obtained in the same manner as Example 1, except that 2.5 g of resorcinol were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 10.6 g.

Comparative Example 5

An epoxy resin was obtained in the same manner as Example 1, except that 3.7 g of resorcinol were added instead of 5.2 g of 4,4'-dihydroxybiphenyl. Subsequently, an epoxy resin cured product was prepared in the same manner as Example 1, except that the amount of 4,4'-diaminodiphenylsulfone was changed to 9.0 g.

<Measurement of Dynamic Shear Viscosity>

The dynamic shear viscosity (Pa·s) of the epoxy resin was measured with a rheometer (MCR-301, Anton-Paar) at an oscillation mode. The measurement was performed by using a parallel plate with a diameter of 12 mm, at s frequency of 1 Hz, a gap of 0.2 mm and a distortion of 2%. Prior to the measurement, the epoxy resin was melted at 150° C. for at least 3 minutes. Then, a process of decreasing the temperature from 150° C. to 30° C. at a rate of 2° C./min and a process of elevating the temperature from 30° C. to 150° C. at a rate of 2° C./min were performed in this order.

Figure 2:
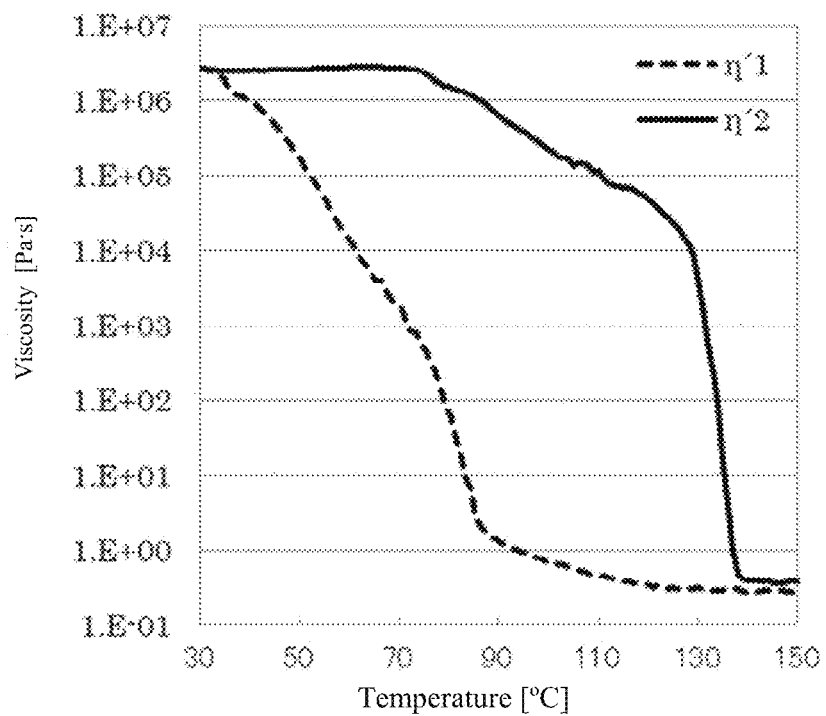
FIG. 2 is a graph showing the results of the measurement of dynamic shear viscosity of the epoxy resin prepared in Comparative Example 1.

During the process of decreasing the temperature and the process of increasing the temperature, the viscosity of the epoxy resin was measured once while the temperature changes by 1° C., and a maximum value of η'2/η'1 was calculated from η'1, a dynamic shear viscosity measured in the process of decreasing the temperature, and η'2, a dynamic shear viscosity measured in the process of increasing the temperature. The temperature at which the value of η'2/η'1 was the largest and the value η'1 and η'2 measured at 100° C. are shown in Table 1. The graphs obtained in the measurement of dynamic shear viscosity of the epoxy resins prepared in Example 1 and Comparative Example 1 are shown in FIG. 1 and FIG. 2, respectively.

<Evaluation of Spreadability>

The spreadability and fluidity of the epoxy resin were evaluated by the following process. A stainless steel plate was placed on a hot plate heated at 150° C., and a PET film was placed and fixed on the stainless steel plate. The epoxy resin in several grams was placed on the PET film and allowed to melt. The temperature of the hot plate was lowered to 100° C., and maintained at this temperature for approximately 5 minutes. The epoxy resin was spread on the PET film with an applicator heated at 100° C. with a gap of 100 μm. The spreadability of the epoxy resin was evaluated by the following criteria. The results are shown in Table 1.

A: The epoxy resin maintains fluidity, and is spreadable for 10 cm with a generally uniform appearance.

B: The epoxy resin maintains fluidity, and is spreadable for 10 cm with a partly scratchy appearance.

C: The epoxy resin maintains fluidity, but scratchy appearance is significant when it is spread.

D: The epoxy resin is too viscous to spread, or cannot spread at all.

<Evaluation of Fracture Toughness>

The fracture toughness (MPa·m$^{1/2}$) of the samples was measured by a three-point bending test according to ASTM D5045 with a tester (Instron 5948 from Instron). The results are shown in Table 1.

<Evaluation of Heat Resistance>

The glass transition temperature (Tg, ° C.) of the samples was measured as an indicator for heat resistance. The measurement was performed by a dynamic viscoelasticity measurement at a tensile mode, at a frequency of 10 Hz, a rate of temperature elevation of 5° C./min, and a distortion of 0.1%. The measurement was performed by using RSA-G2 (TA Instruments). The temperature corresponding to the maximum value of tan δ in a temperature-tan δ chart was determined as a glass transition temperature. The results are shown in Table 1.

<X-Ray Diffraction Measurement>

The epoxy resin cured product was subjected to X-ray diffraction measurement, in order to confirm whether or not a smectic structure was formed. The measurement was conducted by using CuKα1 line, under a tube voltage of 40 kV, a tube current of 20 mA, a sampling width of 0.01°, a scan rate of 1°/min, and a measurement range of 2θ=2° to 30°. The measurement was performed by using a X-ray diffractometer (Rigaku Corporation). The results are shown in Table 1.

Yes: a diffraction peak appears in a range of 2θ=2° to 10°, indicating that a smectic structure is formed.

No: a diffraction peak does not appear in a range of 2θ=2° to 10°, indicating that a smectic structure is not formed.

TABLE 1

|  | Examples | | | | | | | Comparative Examples | | | | |
|---|---|---|---|---|---|---|---|---|---|---|---|---|
|  | 1 | 2 | 3 | 4 | 5 | 6 | 7 | 1 | 2 | 3 | 4 | 5 |
| Maximum value of $\eta'2/\eta'1$ | 1.6 | 4.2 | 1.7 | 19.4 | 7.0 | 12.1 | 1.3 | 528,476 | 43,872 | 88,286 | 1,606 | 1.5 |
| Temperature at which $\eta'2/\eta'1$ is largest (° C.) | 38 | 104 | 62 | 103 | 105 | 99 | 50 | 88 | 95 | 103 | 115 | 105 |
| $\eta'1$ (Pa·s, 100° C.) | 2.5 | 138 | 1.6 | 7.5 | 118 | 3.2 | 364 | 0.7 | 1.0 | 0.8 | 49 | 2,950 |
| $\eta'2$ (Pa·s, 100° C.) | 2.7 | 322 | 1.6 | 142 | 158 | 37.5 | 198 | 212,000 | 41,700 | 50,000 | 78,700 | 4,522 |
| Spreadability | A | B | A | C | B | C | B | D | D | D | D | D |
| Fracture toughness (MPa·m$^{1/2}$) | 1.63 | 1.31 | 1.22 | 1.30 | 1.31 | 1.30 | 1.29 | 1.26 | 1.30 | 1.20 | 1.26 | 1.23 |
| Glass transition temperature (° C.) | 223 | 226 | 227 | 220 | 226 | 226 | 245 | 242 | 229 | 250 | 224 | 195 |
| X-ray diffraction | Yes | Yes | Yes | Yes | Yes | Yes | Yes | Yes | Yes | Yes | Yes | Yes |

As shown in Table 1, the epoxy resins prepared in Example 1 to 7, having a maximum value of $\eta'2/\eta'1$ of 20 or less, exhibited superior spreadability as compared with the epoxy resins prepared in Comparative Example 1 to 4, having a maximum value of $\eta'2/\eta'1$ of greater than 20. The epoxy resin prepared in Comparative Example 5, which has a maximum value of $\eta'2/\eta'1$ of 20 or less but the value of $\eta'2$ is much greater than 1,000 Pa·s, exhibited inferior spreadability.

In addition, the epoxy resin cured products prepared in Example 1 to 7 exhibited a high degree of fracture toughness and a high degree of glass transition temperature.

The disclosure of PCT/JP2016/080629 is incorporated herein in its entirety by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. An epoxy resin comprising a multimer; wherein the multimer is a reaction product of a diepoxy monomer having a mesogenic structure and a difunctional benzene or biphenyl compound having functional groups that are capable of reacting with an epoxy group of the diepoxy monomer;
   wherein the diepoxy monomer and the difunctional benzene or biphenyl compound are provided in a reaction ratio to yield a reaction product, such that when performing a process of decreasing a temperature of the epoxy resin from 150° C. to 30° C. at a rate of 2° C./min, and a process of increasing the temperature of the epoxy resin from 30° C. to 150° C. at a rate of 2° C./min, in this order:
   the epoxy resin has a maximum value of $\eta'2/\eta'1$ of 20 or less within a temperature range of from 30° C. to 150° C., wherein $\eta'1$ is a dynamic shear viscosity (Pa·s) measured in the process of decreasing the temperature, and $\eta'2$ is a dynamic shear viscosity (Pa·s) measured in the process of increasing the temperature, $\eta'1$ and $\eta'2$ being measured at the same temperature, and a value of $\eta'2$ measured at 100° C. is 1000 Pas or less.

2. The epoxy resin according to claim 1, which is capable of forming a smectic structure when cured by reaction with a curing agent.

3. An epoxy resin composition, comprising the epoxy resin according to claim 1 and a curing agent.

4. An epoxy resin cured product, comprising a cured product of the epoxy resin composition according to claim 3.

5. A composite material, comprising the epoxy resin cured product according to claim 4 and a reinforcing material.

6. The epoxy resin according to claim 1, comprising 10% by mass or more of the multimer.

7. The epoxy resin according to claim 1, wherein the difunctional benzene or biphenyl compound is selected from the group consisting of a dihydroxybenzene compound, a diaminobenzene compound, a dihydroxybiphenyl compound, and a diaminobiphenyl compound.

8. The epoxy resin according to claim 1, wherein the multimer includes a dimer compound having two structures derived from the diepoxy monomer and one structure derived from the difunctional benzene or biphenyl compound.

9. The epoxy resin according to claim 1, wherein the diepoxy monomer has the following structure:

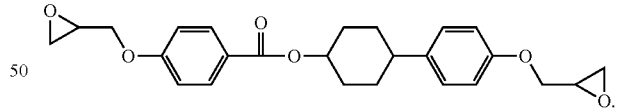

10. The epoxy resin according to claim 1, wherein the diepoxy monomer has the following structure:

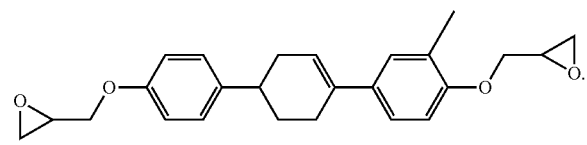 [SMILES: Cc1cc(C2=CCC(c3ccc(OCC4CO4)cc3)CC2)ccc1OCC1CO1]

* * * * *